(12) United States Patent
Nogawa

(10) Patent No.: US 12,174,724 B2
(45) Date of Patent: Dec. 24, 2024

(54) METHOD, RECORDING MEDIUM, AND APPARATUS FOR OUTPUTTING INFORMATION REGARDING PRINTING INTERRUPTION

(71) Applicant: Konica Minolta, Inc., Tokyo (JP)

(72) Inventor: Tetsuren Nogawa, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 36 days.

(21) Appl. No.: 18/184,683

(22) Filed: Mar. 16, 2023

(65) Prior Publication Data

US 2023/0325297 A1 Oct. 12, 2023

(30) Foreign Application Priority Data

Apr. 8, 2022 (JP) .................................. 2022-064364

(51) Int. Cl.
*G06F 11/34* (2006.01)
*G06F 11/07* (2006.01)
*G06F 11/32* (2006.01)

(52) U.S. Cl.
CPC ...... *G06F 11/3476* (2013.01); *G06F 11/0733* (2013.01); *G06F 11/324* (2013.01)

(58) Field of Classification Search
CPC . G06F 11/3476; G06F 11/0733; G06F 11/324
See application file for complete search history.

(56) References Cited

U.S. PATENT DOCUMENTS

| 2020/0213453 A1* | 7/2020 | Park | G06F 11/0748 |
| 2021/0294687 A1* | 9/2021 | Friedrich | H04N 1/00029 |
| 2022/0291983 A1* | 9/2022 | Sugimoto | G06F 11/0775 |

FOREIGN PATENT DOCUMENTS

| JP | H06-282469 A | 10/1994 |
| JP | 2004280324 A | 10/2004 |
| JP | 2016146115 A | 8/2016 |
| JP | 2018-005352 A | 1/2018 |
| JP | 2018-190337 A | 11/2018 |
| JP | 2019-186599 A | 10/2019 |
| JP | 2019-202450 A | 11/2019 |
| JP | 2020129246 A | 8/2020 |

OTHER PUBLICATIONS

Notice of Reasons for Rejection issued in corresponding Japanese Patent Application No. 2022-064364, dated Jun. 13, 2023, 11 pages.
Office Action issued in corresponding Japanese Patent Application No. 2022-064364, dated Aug. 8, 2023, with translation (12 pages).

(Continued)

*Primary Examiner* — Nadeem Iqbal
(74) *Attorney, Agent, or Firm* — Osha Bergman Watanabe & Burton LLP

(57) ABSTRACT

A method for outputting information in a printing process, includes: acquiring, from an image forming apparatus, a log including a piece of interruption information for each of a plurality of interruption factors; aggregating, for each of the interruption factors, a plurality of pieces of the interruption information; and outputting the interruption information aggregated for each of the interruption factors.

16 Claims, 12 Drawing Sheets

(56) References Cited

OTHER PUBLICATIONS

"Remote management services of output devices @ Remote," Ricoh, web address: https://www.ricoh.co.jp/-/Media/Ricoh/Sites/co_jp/pdf/34211419/atremote.pdf (7 pages).
Notice of Reasons for Refusal issued in corresponding Japanese Patent Application No. 2023-200584, dated Jul. 2, 2024 (6 pages).

* cited by examiner

FIG. 3

IDENTIFICATION OF PRINT INTERRUPTION FACTOR (UNIT: MINUTE)

INTERRUPTION FACTOR THAT TOOK LONGEST TIME ▨ SECOND ▨ THIRD

| | 03/06(Sun) | 03/07(Mon) | 03/08(Tue) | 03/09(Wed) | 03/10(Thu) | 03/11(Fri) | 03/12(Sat) | TOTAL |
|---|---|---|---|---|---|---|---|---|
| ˅ MACHINE 1 | 151 | 102 | 74 | 267 | 136 | 161 | 124 | 1,015 |
| OUT OF PAPER | 23 | 78 | 42 | 141 | 115 | 144 | 68 | 611 |
| TRAY FULL | 128 | 24 | 32 | 126 | 21 | 17 | 56 | 404 |
| PAPER JAM | 0 | 0 | 0 | 0 | 0 | 0 | 0 | 0 |
| OUT OF TONER | 0 | 0 | 0 | 0 | 0 | 0 | 0 | 0 |
| ˅ MACHINE 2 | 66 | 75 | 76 | 73 | 71 | 74 | 71 | 506 |
| OUT OF PAPER | 32 | 35 | 36 | 36 | 31 | 36 | 31 | 237 |
| TRAY FULL | 34 | 37 | 37 | 34 | 37 | 35 | 37 | 251 |
| PAPER JAM | 0 | 3 | 3 | 3 | 3 | 3 | 3 | 18 |
| OUT OF TONER | 0 | 0 | 0 | 0 | 0 | 0 | 0 | 0 |

FIG. 7

IDENTIFICATION OF PRINT INTERRUPTION FACTOR (UNIT: MINUTE)

INTERRUPTION FACTOR THAT TOOK LONGEST TIME ▨ SECOND ▨ THIRD ▨

| | 2/27 TO 3/5 | 3/6 TO 3/12 | 3/13 TO 3/19 | 3/20 TO 3/26 | 3/27 TO 4/2 | TOTAL |
|---|---|---|---|---|---|---|
| MACHINE 1 | 1504 | 1065 | 1394 | 1411 | 1338 | 6712 |
| OUT OF PAPER | 645 | 611 | 587 | 657 | 688 | 3188 |
| TRAY FULL | 529 | 404 | 607 | 604 | 650 | 2794 |
| PAPER JAM | 330 | 0 | 200 | 0 | 0 | 530 |
| OUT OF TONER | 0 | 50 | 0 | 150 | 0 | 200 |
| MACHINE 2 | 570 | 1128 | 765 | 1290 | 797 | 4550 |
| OUT OF PAPER | 243 | 237 | 235 | 230 | 120 | 1065 |
| TRAY FULL | 20 | 251 | 230 | 300 | 0 | 801 |
| PAPER JAM | 237 | 640 | 300 | 560 | 677 | 2414 |
| OUT OF TONER | 70 | 0 | 0 | 200 | 0 | 270 |

FIG. 8

IDENTIFICATION OF PRINT INTERRUPTION FACTOR (UNIT: MINUTE)

INTERRUPTION FACTOR THAT TOOK LONGEST TIME ▨ SECOND ▨ THIRD ▨

| | 2/27 TO 3/5 | 3/6 TO 3/12 | 3/13 TO 3/19 | 3/20 TO 3/26 | 3/27 TO 4/2 | TOTAL |
|---|---|---|---|---|---|---|
| OPERATOR A | 1504 | 1065 | 1394 | 1411 | 1338 | 6712 |
| OUT OF PAPER | 645 | 611 | 587 | 657 | 688 | 3188 |
| TRAY FULL | 529 | 404 | 607 | 604 | 650 | 2794 |
| PAPER JAM | 330 | 0 | 200 | 0 | 0 | 530 |
| OUT OF TONER | 0 | 50 | 0 | 150 | 0 | 200 |
| OPERATOR B | 570 | 1128 | 765 | 1440 | 797 | 4700 |
| OUT OF PAPER | 243 | 237 | 235 | 330 | 120 | 1165 |
| TRAY FULL | 20 | 251 | 230 | 350 | 0 | 851 |
| PAPER JAM | 237 | 640 | 300 | 560 | 677 | 2414 |
| OUT OF TONER | 70 | 0 | 0 | 200 | 0 | 270 |

FIG. 9

IDENTIFICATION OF PRINT INTERRUPTION FACTOR (UNIT: MINUTE)

INTERRUPTION FACTOR THAT TOOK LONGEST TIME ▨ SECOND ▨ THIRD ▨

| | 2/27 TO 3/5 | 3/6 TO 3/12 | 3/13 TO 3/19 | 3/20 TO 3/26 | 3/27 TO 4/2 | TOTAL |
|---|---|---|---|---|---|---|
| MACHINE 1 | OPERATOR A | OPERATOR A | OPERATOR C | OPERATOR A | OPERATOR B | |
| | 1504 | 1054 | 650 | 1411 | 1188 | 5807 |
| OUT OF PAPER | 645 (953A) | 600 | 300 | 657 (952A) | 100 | 2302 |
| TRAY FULL | 529 | 404 | 150 | 604 | 400 | 2087 |
| PAPER JAM | 330 | 0 | 200 | 0 | 688 (951A) | 1218 |
| OUT OF TONER | 0 | 50 | 0 | 150 | 0 | 200 |
| MACHINE 2 | OPERATOR B | OPERATOR B | OPERATOR C | OPERATOR C | OPERATOR B | |
| | 1050 | 1277 | 765 | 1190 | 1457 | 5739 |
| OUT OF PAPER | 343 | 237 | 235 | 230 | 120 | 1165 |
| TRAY FULL | 200 | 400 | 230 | 300 | 660 (952B) | 1790 |
| PAPER JAM | 437 | 640 (953B) | 300 | 460 | 677 (951B) | 2514 |
| OUT OF TONER | 70 | 0 | 0 | 200 | 0 | 270 |

IDENTIFICATION OF PRINT INTERRUPTION FACTOR (UNIT: MINUTE) 1010

INTERRUPTION FACTOR THAT TOOK LONGEST TIME  SECOND ▨  THIRD ▨         1030

| | MACHINE 1 | MACHINE 2 | MACHINE 3 | MACHINE 4 | MACHINE 5 | TOTAL |
|---|---|---|---|---|---|---|
| OUT OF PAPER | 611 | 237 | 229 | 235 | 244 | 1556 |
| TRAY FULL | 404 | 251 | 238 | 244 | 400 | 1537 |
| PAPER JAM | 0 | 18 | 48 | 50 | 0 | 116 |
| OUT OF TONER | 0 | 0 | 0 | 150 | 40 | 190 |

1000

1051 — 1052 — 1053 — 1040 — 1020

METHOD, RECORDING MEDIUM, AND APPARATUS FOR OUTPUTTING INFORMATION REGARDING PRINTING INTERRUPTION

CROSS-REFERENCE TO RELATED APPLICATIONS

The present application claims priority from Japanese patent Application No. 2022-064364, filed on Apr. 8, 2022, the contents of which are incorporated herein by reference in their entirety.

BACKGROUND

Technical Field

The present disclosure relates to a technique for outputting information regarding printing interruption, and more specifically, to a technique for outputting information for each factor of printing interruption.

Description of Related Art

When a printed matter is produced using an image forming apparatus, a printing process may be interrupted due to various factors such as out of paper and paper jam. Conventionally, there is known a technique of notifying interruption of a printing process when interruption of the printing process occurs.

For example, JP 2019-202450 A discloses a technology for notifying an operator of an error handling request when the printing process is interrupted. The technology is such that "when an error to be an interruption factor of printing occurs, a mobile terminal to which an error handling is to be requested is determined as a worker from among mobile terminals possessed by a plurality of operators, and a handling request is transmitted. Further, an error occurrence notification is further transmitted to the remaining mobile terminals. Moreover, when a rejection response is received from the worker to whom the handling request has been made, another available worker is found and the response request is transmitted to him or her." (See [Abstract]).

According to the technique disclosed in JP 2019-202450 A, the operator who has received the notification of error handling may be able to handle the interruption of individual printing process. However, since the operator cannot obtain information such as factors that frequently interrupt the printing process, the operator cannot make a lasting response. Therefore, there is a need for a technology for supporting grasping a tendency of occurrence of an interruption process for each of interruption factors in the printing process.

SUMMARY

One or more embodiments of the present disclosure provide a technology for supporting grasping a tendency of occurrence of an interruption process for each of interruption factors in a printing process.

According to an aspect of the present invention, a method for outputting information in a printing process, comprises: acquiring, from an image forming apparatus, a log including a piece of interruption information for each of a plurality of interruption factors; aggregating, for each of the interruption factors, a plurality of pieces of the interruption information; and outputting the interruption information aggregated for each of the interruption factors.

According to another aspect of the present invention, a method for outputting a screen of information in a printing process, comprises: analyzing a log collected from an image forming apparatus and aggregating a plurality of pieces of interruption information for each of a plurality of interruption factors; generating a layout of the screen in which the interruption information is aggregated for at least one of the image forming apparatus and an operator who operates the image forming apparatus; and outputting the screen.

BRIEF DESCRIPTION OF THE DRAWINGS

The aspects, advantages and features provided by one or more embodiments of the invention will become more fully understood from the detailed description given hereinbelow and the appended drawings which are given by way of illustration only, and thus are not intended as a definition of the limits of the present invention:

FIG. 3 is a diagram illustrating a first example of a screen of an aggregation result of information regarding interruption (i.e., interruption information) for each interruption factor output by the system 10;

FIG. 7 is a diagram illustrating a third example of the screen of the aggregation result of the information regarding interruption for each interruption factor output by the system 10;

FIG. 8 is a diagram illustrating a fourth example of the screen of the aggregation result of the information regarding interruption for each interruption factor output by the system 10;

FIG. 9 is a diagram illustrating a fifth example of the screen of the aggregation result of the information regarding interruption for each interruption factor output by the system 10;

FIG. 10 is a diagram illustrating a sixth example of the screen of the aggregation result of the information regarding interruption for each interruption factor output by the system 10;

DETAILED DESCRIPTION OF EMBODIMENTS

Figure 1:
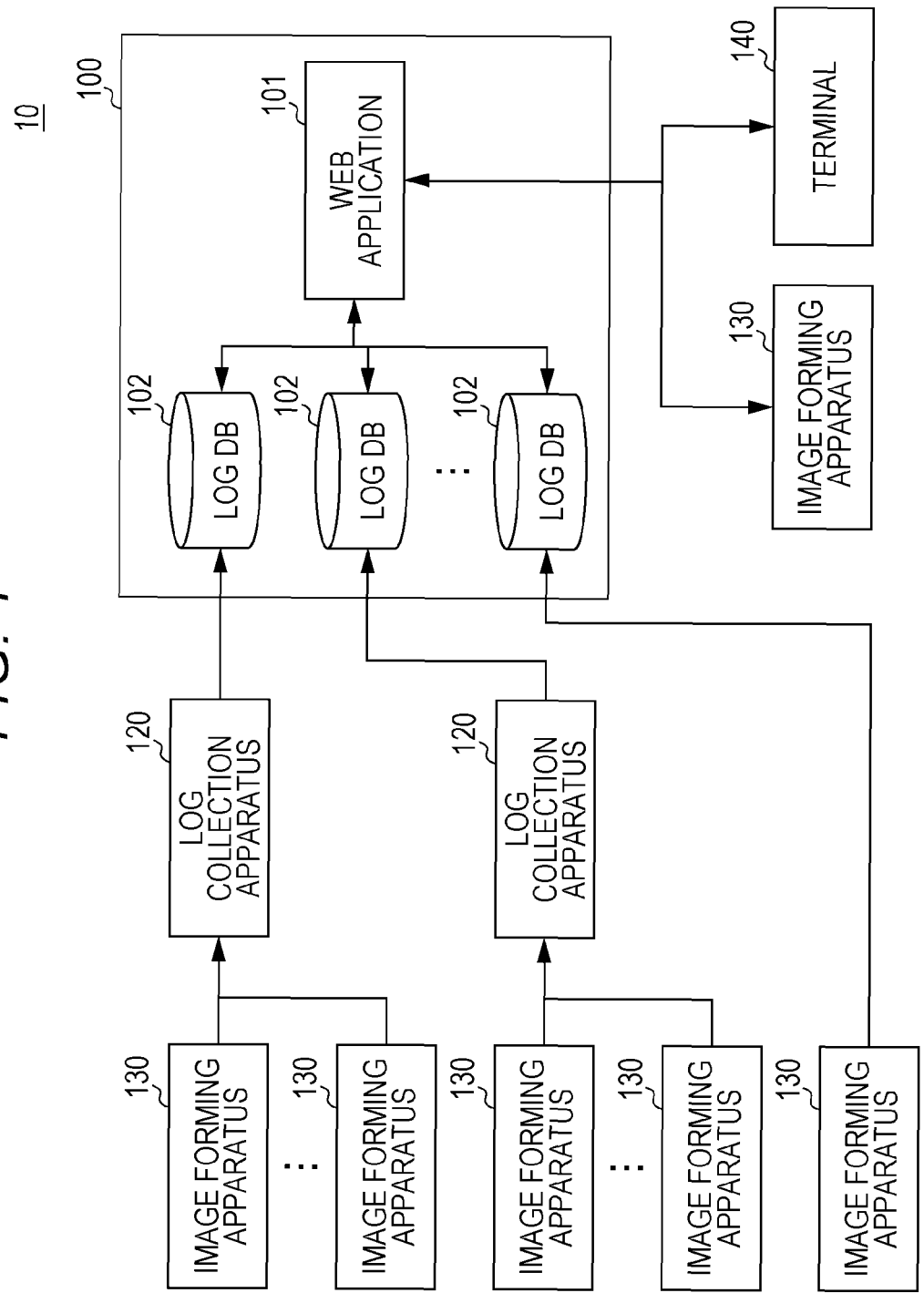
FIG. 1 is a diagram illustrating an example of a system 10 according to one or more embodiments.

Hereinafter, embodiments of the technical concept according to the present invention will be described with reference to the drawings. In the following description, the same parts are designated by the same reference numerals. Their names and functions are the same. Therefore, the detailed description of them will not be repeated. However, the scope of the invention is not limited to the disclosed embodiments.

A. Application Examples

FIG. 1 is a diagram illustrating an example of a system 10 according to one or more embodiments. An application example of technology of the present disclosure will be described with reference to FIG. 1. As an example, the technology of the present disclosure can be provided as a system 10 that collects logs of one or more image forming apparatuses (mainly, logs related to interruption of printing process). The log includes at least one of: identification information of the image forming apparatus, and identification information of an operator who operates the image forming apparatus.

As an example, the system 10 may analyze the collected logs, aggregate information regarding interruption (i.e., interruption information) such as interruption time or the number of interruptions of the printing process for each interruption factor, and output a screen 300 (see FIG. 3) or the like representing aggregation results of interruption factors in a matrix on the basis of a plurality of conditions such as an image forming apparatus, an operator, and time (minutes/hour/day/week/month/year or the like). Further, the system 10 may also highlight the aggregation results of the interruption factors that satisfy certain conditions. Details of a screen provided by the system 10 and conditions of gradation display will be described later. The system 10 operates as, for example, a web application, and can distribute (output) the screen 300 and the like to the terminal of the user.

In the present specification, the "image forming apparatus" includes a multifunction peripheral (MFP), a business printer, a production printer, a home printer, or any other apparatus having a printing function. The image forming apparatus can print an image on an arbitrary medium other than paper. In the present disclosure, the printing process means a printing process on an arbitrary medium such as paper, film, or cloth.

In the present specification, the "operator" is a person who operates the image forming apparatus such as a large production printer used in a printing company or the like. Usually, the operator logs in to the image forming apparatus and uses the image forming apparatus. Therefore, it can also be said that the operator operating the image forming apparatus is an operator logging in to the image forming apparatus.

In the present specification, a "log" is any record generated by the image forming apparatus. As an example, the log may be a log related to interruption of the printing operation, and in this case, the log may include a time stamp, an identifier of the image forming apparatus that has generated the log, an identifier (login information) of an operator operating the image forming apparatus, an interruption factor of the printing process, and information regarding interruption. Note that the log output by the image forming apparatus that does not require a login at the time of use may not include the identifier (login information) of the operator.

In the present specification, the "interruption factor" includes any factor that interrupts the printing process of the image forming apparatus. As an example, the interruption factor includes any factor such as out of paper, paper jam, tray full, out of toner, out of ink, and the like. Note that, in the following description, it is assumed that the image forming apparatus prints a sheet, but an application example of the technology of the present disclosure is not limited to the image forming apparatus that prints a sheet. The terms "paper, sheet, and discharge" in the following may be replaced with any medium. The tray full means a state in which a sheet ejection tray is filled with paper and the image forming apparatus cannot discharge any more paper.

In the present specification, the "information regarding interruption" includes the number of interruptions of the printing process and the interruption time in the printing process (time period from start of printing interruption to restart of printing operation; the interruption time starts from when the printing process is interrupted due to any one of the interruption factors and ends when the printing process is resumed). Hereinafter, the number of interruptions of the printing process and the interruption time in the printing process are simply referred to as the number of interruptions and the interruption time. In addition, the information regarding interruption may mean a cumulative total of the number of interruptions in a certain fixed period (such as minutes/hour/day/week/month/year), an average number of interruptions in every certain period (such as minutes/hour/day/week/month/year), a cumulative total of the interruption time in a certain fixed period (such as minutes/hour/day/week/month/year), and an average interruption time in every certain period (such as minutes/hour/day/week/month/year).

In the present specification, the "system" includes a configuration including one or a plurality of apparatuses, and a service, a virtual machine, an instance, a container, and the like built on a cloud environment. Furthermore, the system includes a combination of a configuration including one or a plurality of apparatuses and a service, a virtual machine, an instance, a container, and the like constructed on a cloud environment and the image forming apparatus.

As used herein, "user" means any person utilizing the system 10. The user includes an operator who operates the image forming apparatus, a supervisor of a manufacturing site, a manager of the system 10, a maintenance person of the image forming apparatus, a person in charge of a manufacturing company of the image forming apparatus, and the like.

A configuration of the system 10 will be described. The system 10 includes an information processing apparatus 100, a log collection apparatus 120, and an image forming apparatus 130 as main configurations. In a certain aspect, the system 10 may include the information processing apparatus 100 and the log collection apparatus 120 and may not include the image forming apparatus 130. In this case, the system 10 communicates with an external image forming apparatus 130. In another aspect, the system 10 may include the information processing apparatus 100 and may not include the log collection apparatus 120 and the image forming apparatus 130. In this case, the system 10 communicates with an external log collection apparatus 120 and/or the external image forming apparatus 130.

The information processing apparatus 100 analyzes a log of one or more image forming apparatuses 130, generates a screen (such as the screen 300) of an aggregation result of the information regarding interruption for each interruption factor, and distributes the generated screen. In a certain aspect, the information processing apparatus 100 may acquire the log of each image forming apparatus 130 via the log collection apparatus 120. In another aspect, the information processing apparatus 100 may directly receive the log from each image forming apparatus 130. The information processing apparatus 100 includes a web application 101 and a log database (DB) 102.

The web application 101 analyzes logs stored in the log DB 102, and transmits the screen of the aggregation result of the information regarding interruption for each interruption factor generated from the analysis result to a terminal 140 of the user or the image forming apparatus 130. By referring to the screen displayed on the display of the terminal 140 or the display of the image forming apparatus 130, the user can grasp what has mainly caused the interruption of the printing process of the image forming apparatus 130.

The log DB 102 stores the log of one or more image forming apparatuses 130. The information processing apparatus 100 stores the received log in the log DB 102. In a certain aspect, the image forming apparatus 130 may include a plurality of log DBs 102. In this case, each of the plurality of log DBs 102 may store the log of an individual image forming apparatus 130, or may store the log of the image forming apparatus 130 in any unit such as an office or a manufacturing site. In another aspect, the image forming apparatus 130 may include a single log DB 102. In this case, the log DB 102 stores the logs of all the image forming apparatuses 130.

The log collection apparatus 120 receives the log from one or more image forming apparatuses 130 and transfers the log to the information processing apparatus 100. As an example, the log collection apparatus 120 may be disposed in an office, a manufacturing site, or the like and function as a gateway. In this case, the log collection apparatus 120 can transfer the log received via an intra-company network to the information processing apparatus 100 via the public network.

The image forming apparatus 130 is an apparatus having an arbitrary printing function, and transmits, periodically or when a failure occurs, a log related to printing interruption to the log collection apparatus 120 or the information processing apparatus 100. The log related to printing interruption may include a time stamp, an identifier of the image forming apparatus 130 that has generated the log, an identifier (login information) of an operator operating the image forming apparatus 130, an interruption factor of the printing process, and the information regarding interruption.

As described above, the system 10 collects the log related to printing interruption from one or more image forming apparatuses 130, generates the screen (such as the screen 300) of the aggregation result of the information regarding interruption for each interruption factor, and distributes the generated screen. By referring to the screen distributed by the system 10, the user can grasp what has mainly caused the interruption of the printing process of the image forming apparatus 130, and consider improvement measures against frequent interruption factors, so that it is possible to make a lasting response to a failure, and it is possible to reduce the downtime (interruption time) and improve the productivity of printing operation.

Figure 2:
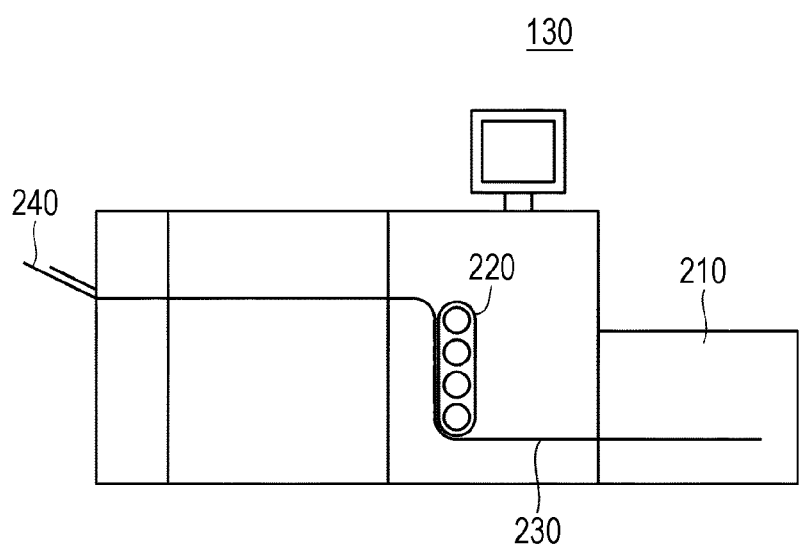
FIG. 2 is a diagram illustrating an example of an image forming apparatus 130 according to one or more embodiments.

FIG. 2 is a diagram illustrating an example of the image forming apparatus 130 according to one or more embodiments. The image forming apparatus 130 mainly includes a sheet feeding tray 210, an image forming unit 220, a sheet conveyance path 230, and a sheet ejection tray 240.

The sheet feeding tray 210 stores sheets for printing processes. When the paper stored in the sheet feeding tray 210 runs out during a printing process, the image forming apparatus 130 interrupts the printing process. The interruption factor in this case is out of paper. When out of paper occurs, the image forming apparatus 130 transmits a log including information of the interruption factor "out of paper" to the log collection apparatus 120 or the information processing apparatus 100.

The image forming unit 220 forms an image on a sheet. In a certain aspect, the image forming unit 220 may be an image forming unit that uses toner. When the toner runs out during the printing process, the image forming apparatus 130 interrupts the printing process. The interruption factor in this case is out of toner. When out of toner occurs, the image forming apparatus 130 transmits a log including information of the interruption factor "out of toner" to the log collection apparatus 120 or the information processing apparatus 100. In another aspect, the image forming unit 220 may be an image forming unit that uses ink. When the ink runs out during the printing process, the image forming apparatus 130 interrupts the printing process. In this case, the interruption factor is out of ink. When out of ink occurs, the image forming apparatus 130 transmits a log including information of the interruption factor "out of ink" to the log collection apparatus 120 or the information processing apparatus 100.

The sheet conveyance path 230 is a path that conveys a sheet (medium) used for printing. The sheet conveyance path 230 is connected from the sheet feeding tray 210 to the sheet ejection tray 240. When the sheet is jammed on the sheet conveyance path 230 during the printing process, the image forming apparatus 130 interrupts the printing process. The interruption factor in this case is paper jam. When a paper jam occurs, the image forming apparatus 130 transmits a log including information of the interruption factor "paper jam" to the log collection apparatus 120 or the information processing apparatus 100.

The sheet ejection tray 240 is a tray from which printed sheets are discharged. When the sheet ejection tray 240 is filled with paper during the printing process and the image forming apparatus 130 is no longer capable of discharging paper, the image forming apparatus 130 interrupts the printing process. In this case, the interruption factor is tray full. When a tray full occurs, the image forming apparatus 130 transmits a log including information of the interruption factor "tray full" to the log collection apparatus 120 or the information processing apparatus 100.

FIG. 3 is a diagram illustrating a first example of the screen of the aggregation result of the information regarding interruption for each interruption factor output by the system 10. The system 10 acquires a log including the information regarding interruption from each of one or more image forming apparatuses 130, classifies and aggregates a plurality of pieces of the information regarding interruption acquired for each of the interruption factors, and outputs the information regarding interruption classified and aggregated for each of the interruption factors as in the screen 300, for example. The screen 300 displays information regarding failures aggregated for each interruption factor for each image forming apparatus 130 in a matrix by dividing the information in units of one day. The information regarding failures on the screen 300 is the interruption time, and a unit 310 is "minute(s)". Note that the system 10 may display the information regarding failures aggregated for each interruption factor by dividing the information in units of an arbitrary period (days, weeks, months, years, or the like). In a certain aspect, the information processing apparatus 100 may classify and aggregate logs. In another aspect, the image forming apparatus 130 may classify logs. In this case, the information processing apparatus 100 aggregates the classified logs. In another aspect, the image forming apparatus 130 may execute a part of log aggregation processing such as aggregation of logs in an arbitrary period (date, month, or the like).

A vertical axis 320 of the matrix indicates a list of interruption factors for each image forming apparatus 130. In the example illustrated in FIG. 3, the vertical axis 320 of the matrix includes interruption factors of machine 1 "out of paper, tray full, paper jam, and out of toner" and interruption factors of machine 2 "out of paper, tray full, paper jam, and out of toner". The "machine 1 and machine 2" are names of the image forming apparatus 130, and any name can be designated by the user. In a certain aspect, the system 10 may receive input of the name of each image forming apparatus 130 from the user in advance via a setting screen. In this case, the system 10 manages the name of each image forming apparatus 130 and the identifier of each image forming apparatus 130 in association with each other.

A horizontal axis 330 of the matrix indicates a period (date). In the example illustrated in FIG. 3, the horizontal axis 330 of the matrix includes, as items, "3/6 (Sun)", "3/7 (Mon)", "3/8 (Tue)", "3/9 (Wed)", "3/10 (Thu)", "3/11 (Fri)", "3/6 (Saturday)", and the sum in one week (of the interruption time).

The information regarding the failure shown on the screen 300 will be described using a first column 340 of the matrix as an example. The first column 340 indicates that printing interruption of a total of "151 minutes" has occurred in the machine 1 in the period of "3/6 (Sun)". Further, the first column 340 indicates that, out of the total time "151 minutes" of the printing interruption in the machine 1, the interruption time caused by the interruption factor "out of paper" is "23 minutes", the interruption time caused by the interruption factor "tray full" is "128 minutes", the interruption time caused by the interruption factor "paper jam" is "0 minute", and the interruption time caused by the interruption factor "out of toner" is "0 minute".

Similarly, the first column 340 indicates that printing interruption of a total of "66 minutes" has occurred in the machine 2 in the period of "3/6 (Sun)". Further, the first column 340 indicates that, out of the total time "66 minutes" of the printing interruption in the machine 2, the interruption time caused by the interruption factor "out of paper" is "32 minutes", the interruption time caused by the interruption factor "tray full" is "34 minutes", the interruption time caused by the interruption factor "paper jam" is "0 minute", and the interruption time caused by the interruption factor "out of toner" is "0 minute".

The system 10 may highlight information regarding interruption satisfying a predetermined condition among pieces of the information regarding interruption displayed on the screen. In the example of the screen 300, an interruption time "144 minutes" (information 351 regarding interruption) caused by the interruption factor "out of paper" in the machine 1 of "3/11 (Friday)" is highlighted. Further, an interruption time "141 minutes" (information 352 regarding interruption) caused by the interruption factor "out of paper" in the machine 1 of "3/9 (water)" is highlighted. Furthermore, an interruption time "128 minutes" (information 53 regarding interruption) caused by the interruption factor "tray full" in the machine 1 of "3/6 (Sun)" is highlighted.

In a certain aspect, the system 10 may determine that the information regarding interruption exceeding a predetermined threshold (interruption time, number of interruptions) satisfies a predetermined condition. To describe the screen 300 as an example, the predetermined threshold value may be "120 minutes", for example. In another aspect, the system 10 may determine that, among all pieces of the information regarding interruption displayed on the screen, pieces of the information regarding interruption in ranks equal to or higher than predetermined rank order (for example, up to top N: N is a predetermined integer) satisfy predetermined conditions. To describe the screen 300 as an example, the information regarding interruption up to the top three (information 351, 352, and 353 regarding interruption) is highlighted, for example. In addition, the system 10 may change the degree of highlighting of each piece of the information regarding interruption in stages on the basis of a value, a rank order, or the like of each piece of the information regarding interruption. For example, the outputting the interruption information may include highlighting one or more pieces of the interruption information that satisfy a predetermined condition among a plurality of pieces of the interruption information included in an output screen. The highlighting the one or more pieces of the interruption information that satisfy the predetermined condition may include highlighting the interruption information having a value exceeding a predetermined threshold. Alternatively, the highlighting the one or more pieces of the interruption information that satisfy the predetermined condition may include highlighting the interruption information having a value in ranks equal to or higher than a rank order designated as a criterion for extracting an interruption factor that frequently causes interruption among the interruption information displayed on the output screen. The highlighting the interruption information having the value in the ranks equal to or higher than the rank order may include changing the highlighting in stages depending on the value in the ranks or the rank order of the interruption information.

By referring to the distributed screen 300 or the like, the user can grasp what has mainly caused the interruption of the printing process of the image forming apparatus, and consider improvement measures against frequent interruption factors, so that it is possible to make a lasting response to a failure, and it is possible to reduce the downtime (interruption time) and improve the productivity of printing operation. To describe the screen 300 as an example, the user can grasp that printing interruption has occurred mainly due to "out of paper, tray full". On the basis of this result, the user may consider a lasting response to a failure, for example, improvement of the business flow, development of an application for notifying "out of paper, tray full", or the like.

Also, as described above, the system 10 may provide an aggregate of the interruption time to the user. In a printing operation, it is extremely important to reduce interruption time (downtime) for improving productivity. The user can improve the productivity of the printing operation by grasping and taking measures for the bottleneck of the printing process by analyzing the aggregate of the interruption time.

In a certain aspect, the system 10 may receive, from the user, an input related to a display setting of a screen (screen 300, screen 600 to screen 1100, or the like) of the aggregation result of the information regarding interruption for each interruption factor. In this case, the system 10 can change the display of the screen of the aggregation result of the information regarding interruption for each interruption factor on the basis of an input of the user.

As a first example, the system 10 may change the type and unit of the information regarding interruption on the basis of an input of the user. More specifically, the system 10 may switch the information regarding interruption to either the interruption time or the number of interruptions. Furthermore, the system 10 can change the unit of the information regarding interruption "interruption time" to "seconds, minute, hour" or the like.

As a second example, the system 10 may change the period of time to aggregate the information regarding interruption (number of interruptions and interruption time) on the basis of the user input. To describe the screen 300 as an example, the system 10 may change the period of the horizontal axis 330 from any period, such as "hour, week, month, year" from "day".

As a third example, the system 10 may aggregate the information regarding interruption for each image forming apparatus 130 on the basis of an input of the user, may aggregate the information regarding interruption of all the image forming apparatuses 130 managed by the system 10, or may group the image forming apparatuses 130 according to any standard and aggregate the information regarding interruption in units of groups. To describe the screen 300 as an example, the system 10 may individually display the interruption time "23 minutes" of the interruption factor "out of paper" of the image forming apparatus 130 "machine 1" and the interruption time "32 minutes" of the interruption factor "out of paper" of the image forming apparatus 130 "machine 2". In addition, the system 10 may display the total interruption time "55 minutes (23 minutes+32 minutes)" of the interruption factors "out of paper" of the image forming apparatuses 130 "machines 1 and 2".

As a fourth example, the system 10 may aggregate the information regarding interruption for each image forming apparatus 130 or may aggregate the information regarding interruption for each operator on the basis of an input of the user. By aggregating the information regarding interruption for each operator, the user can grasp the tendency of operation mistake or the like of each operator. Furthermore, as an example, the system 10 may determine a cumulative total or an average value of the information regarding interruption (interruption time, number of interruptions) for each fixed period (such as seconds/minute/hour/day/week/month/year) on the basis of an input of the user. In addition, the cumulative total and the average value may be a cumulative total value and an average value of the information regarding interruption for each interruption factor for each image forming apparatus 130. Alternatively, the cumulative total and the average value may be a cumulative total value and an average value of the information regarding interruption for each interruption factor for each operator. For example, the system 10 may display, on the screen 300, the screen 600 to the screen 1100, and the like, a cumulative total value of information (interruption time, number of interruptions) regarding interruption during a fixed period, or an average value of information regarding interruption every fixed period.

As a fifth example, the system 10 may change each of the horizontal axis and the vertical axis of the matrix to any item on the basis of an input of the user. For example, the system 10 may set the vertical axis of the matrix to "interruption factor for each operator" and the horizontal axis to "period". In addition, the system 10 may set the vertical axis of the matrix to "interruption factor for each image forming apparatus 130" and the horizontal axis to "period". In addition, the system 10 may set the vertical axis of the matrix to "interruption factor for each image forming apparatus 130" and the horizontal axis to "operator". Furthermore, the system 10 may swap items on the vertical axis and items on the horizontal axis of the matrix of the above example. Furthermore, the item that can be set to each axis can include an "image forming apparatus", an "operator", a "period (such as seconds/minute/hour/day/week/month/year)", an "interruption factor", or a combination thereof. That is, the system 10 may display information regarding interruption in a matrix on the basis of the first item (vertical axis) and the second item (horizontal axis).

As a sixth example, the system 10 may change a display format of the information regarding interruption to any format other than the matrix, such as a pie chart, a bar chart, or a line chart, on the basis of an input of the user. The display format of the information regarding interruption may be a combination of a plurality of formats.

As a seventh example, the system 10 may change an item to be highlighted on the basis of an input of the user. For example, the system 10 may highlight information regarding interruption satisfying a predetermined condition (information regarding interruption up to top N, information regarding interruption exceeding a predetermined threshold, and the like) in units of image forming apparatuses 130.

In addition, the system 10 may highlight information regarding interruption satisfying a predetermined condition (information regarding interruption up to top N, information regarding interruption exceeding a predetermined threshold, and the like) for each group of the image forming apparatuses 130. In addition, the system 10 may highlight information regarding interruption satisfying a predetermined condition (information regarding interruption up to top N, information regarding interruption exceeding a predetermined threshold, and the like) from among the aggregation results of all the image forming apparatuses 130 managed by the system 10.

In addition, the system 10 may highlight information regarding interruption satisfying a predetermined condition (information regarding interruption up to top N, information regarding interruption exceeding a predetermined threshold, and the like) in units of operators. In addition, the system 10 may highlight information regarding interruption satisfying a predetermined condition (information regarding interruption up to top N, information regarding interruption exceeding a predetermined threshold, and the like) for each group of operators (department to which the system belongs, or the like). In addition, the system 10 may highlight information regarding interruption satisfying a predetermined condition (information regarding interruption up to top N, information regarding interruption exceeding a predetermined threshold, and the like) from among the aggregation results of all operators managed by the system 10.

B. Hardware and Software Configurations

Next, a hardware configuration and a software configuration of the information processing apparatus 100, which are main configurations of the system 10, will be described with reference to FIGS. 4 and 5.

Figure 4:
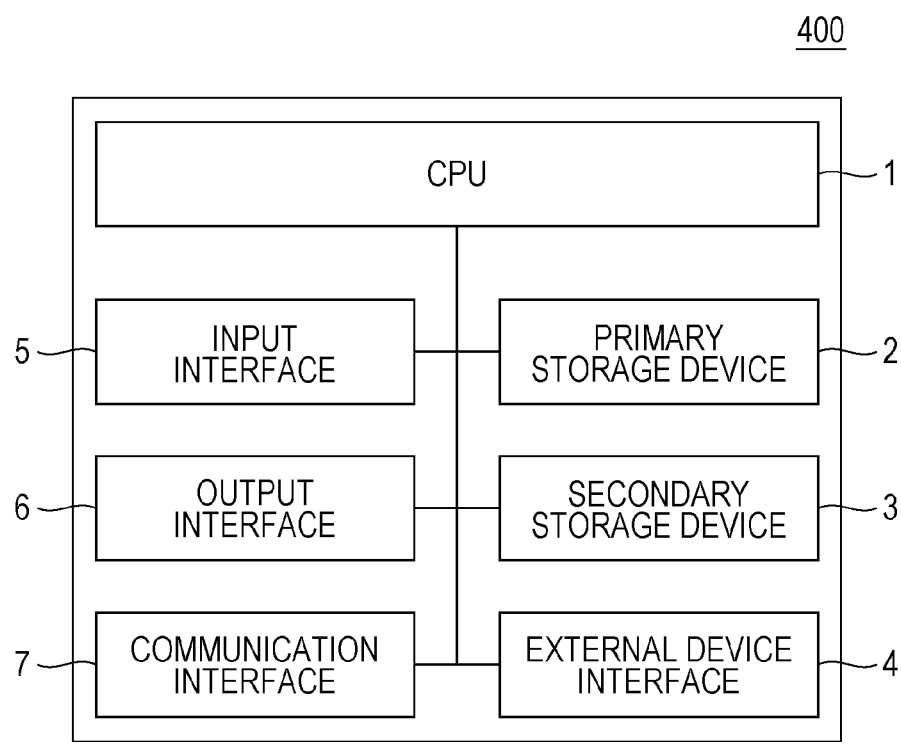
FIG. 4 is a diagram illustrating an example of a hardware configuration of an apparatus 400 that can be used as the information processing apparatus 100.

FIG. 4 is a diagram illustrating an example of a hardware configuration of an apparatus 400 that can be used as the information processing apparatus 100. In a certain aspect, the information processing apparatus 100 may be implemented by a combination of a plurality of apparatuses 400 or some parts of the apparatuses 400. Further, in another aspect, the information processing apparatus 100 may be a virtual machine, a container, or the like built on a data center (cloud environment) implemented by a combination of a plurality of apparatuses 400 or some parts of the apparatuses 400. Moreover, in another aspect, the log collection apparatus 120 may also have a hardware configuration illustrated in FIG. 4.

The apparatus 400 includes one or more processors each comprising a central processing unit (CPU) 1, a primary storage device 2, a secondary storage device 3, an external device interface 4, an input interface 5, an output interface 6, and a communication interface 7.

The CPU 1 can execute a program or instructions for implementing various functions of the apparatus 400. The CPU 1 includes, for example, at least one integrated circuit. The integrated circuit may include, for example, at least one central processing unit (CPU), at least one graphics processing unit (GPU), at least one field programmable gate array (FPGA), at least one application specific integrated circuit (ASIC), a combination thereof, or the like.

The primary storage device 2 (non-transitory computer readable recording medium) stores a program or instructions executed by the CPU 1 and data referred to by the CPU 1. In a certain aspect, the primary storage device 2 may be implemented by a dynamic random access memory (DRAM) or a static random access memory (SRAM) or the like.

The secondary storage device 3 (non-transitory computer readable recording medium) is a nonvolatile memory, and may store a program or instructions executed by the CPU 1 and data referred to by the CPU 1. In this case, the CPU 1 executes the program or instructions read from the secondary storage device 3 to the primary storage device 2, and refers to data read from the secondary storage device 3 to the primary storage device 2. In a certain aspect, the secondary storage device 3 may be implemented by a hard disk drive (HDD), a solid state drive (SSD), an erasable programmable read only memory (EPROM), an electrically erasable programmable read only memory (EEPROM), a flash memory, or the like.

The external device interface 4 can be connected to any external device such as a printer, a scanner, and an external HDD. In a certain aspect, the external device interface 4 may be implemented by a Universal Serial Bus (USB) terminal or the like.

The input interface 5 may be connected to any input device such as a keyboard, a mouse, a touchpad, or a game pad. In a certain aspect, the input interface 5 may be implemented by a USB terminal, a PS/2 terminal, a Bluetooth (registered trademark) module, or the like.

The output interface 6 can be connected to any output device such as a cathode ray tube display, a liquid crystal display, or an organic electro-luminescence (EL) display. In a certain aspect, the output interface 6 may be implemented by a USB terminal, a D-sub terminal, a Digital Visual Interface (DVI) terminal, a High-Definition Multimedia Interface (HDMI) (registered trademark) terminal, or the like.

The communication interface 7 is connected to a wired or wireless network device. In a certain aspect, the communication interface 7 may be implemented by a wired local area network (LAN) port, a Wireless Fidelity (Wi-Fi) (registered trademark) module, or the like. In another aspect, the communication interface 7 may transmit and receive data using a communication protocol such as Transmission Control Protocol/Internet Protocol (TCP/IP) or User Datagram Protocol (UDP).

Figure 5:
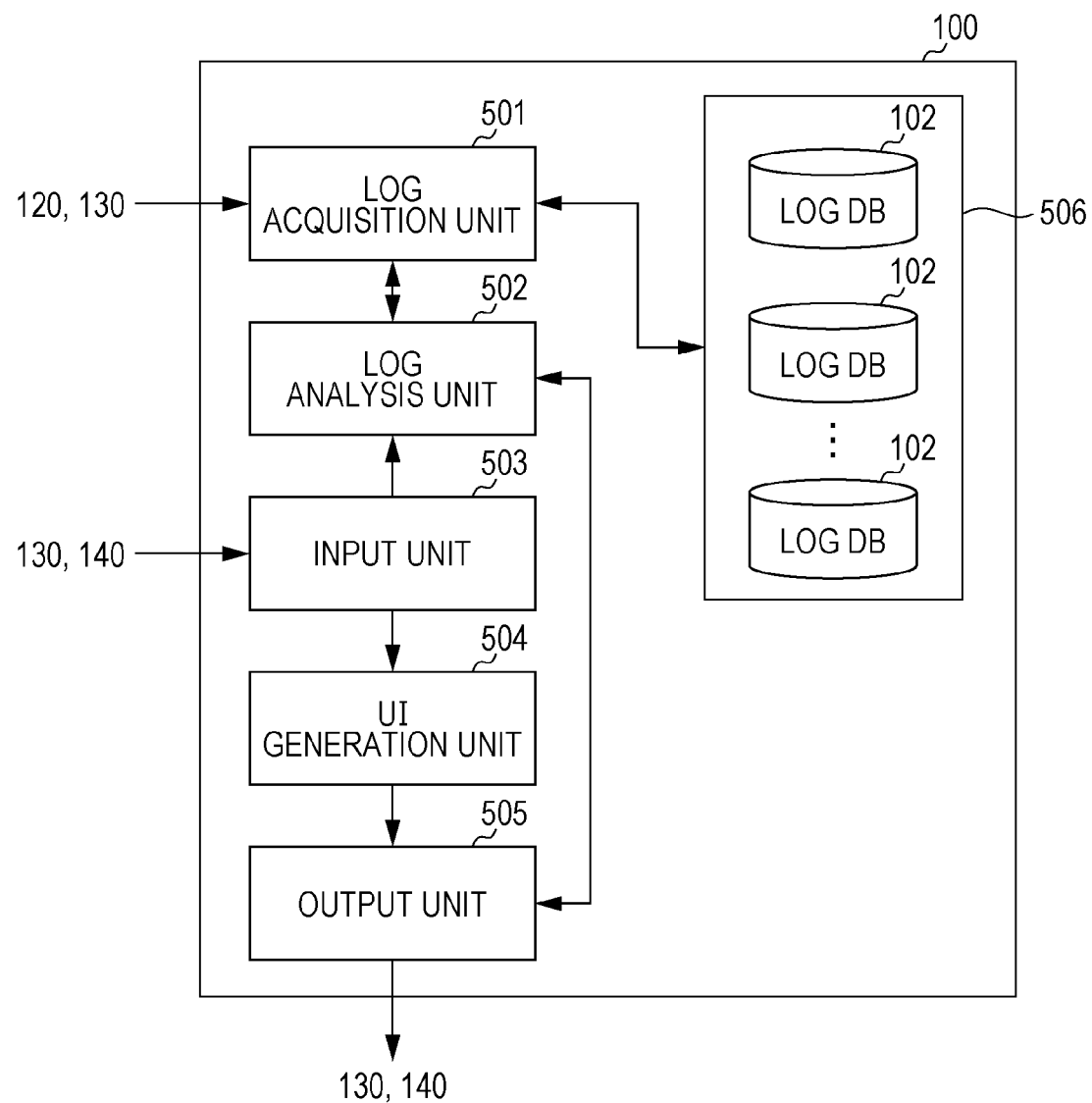
FIG. 5 is a diagram illustrating an example of functional blocks of the information processing apparatus 100.

FIG. 5 is a diagram illustrating an example of functional blocks of the information processing apparatus 100. In a certain aspect, each functional block illustrated in FIG. 5 can be implemented as software. In this case, the CPU 1 may implement each functional block illustrated in FIG. 5 by executing a program or instructions read from the secondary storage device 3 into the primary storage device 2. It can also be said that each functional block illustrated in FIG. 5 is a program module constituting the web application 101.

The information processing apparatus 100 includes, as main functional blocks, a log acquisition unit 501, a log analysis unit 502, an input unit 503, a user interface (UI) generation unit 504, an output unit 505, and a storage 506. Further, the storage 506 includes one or more log DBs 102.

The log acquisition unit 501 acquires a log from the log collection apparatus 120 or the image forming apparatus 130 and stores the log in the log DB 102. Further, the log acquisition unit 501 refers to the log stored in the log DB 102 on the basis of a request from another functional block, and outputs the acquired log to the functional block of the request source. In a certain aspect, another functional block may have a function of referring to a log stored in the log DB 102.

The log analysis unit 502 refers to a log stored in the log DB 102 via the log acquisition unit 501 or directly. Then, the log analysis unit 502 analyzes the log and generates an aggregation result of information regarding interruption (number of interruptions and interruption time) for each interruption factor. For example, the log analysis unit 502 can generate an aggregation result of the number of interruptions or the interruption time in the printing process for each factor such as "out of paper, tray full, paper jam, out of toner (ink)". In addition, the log analysis unit 502 may divide the aggregation result of the information regarding interruption (number of interruptions and interruption time) for each of the interruption factors into units of the image forming apparatus 130, units of operators, and periods. The aggregation result calculated by the log analysis unit 502 is output to the UI generation unit 504.

The input unit 503 acquires various inputs from the user. The input unit 503 can acquire various inputs from the user via a screen provided to the terminal 140 of the user as a part of the web application. As an example, various inputs from the user may include a request for an aggregation screen for each interruption factor, a classification of the screen (screen 300, screen 600 to screen 1100, or the like) of the aggregation result of the information regarding interruption for each interruption factor or selection of aggregation information (selection of image forming apparatus 130 unit, operator unit, period, and the like), and selection of a layout of the aggregation result screen (setting of horizontal axis item, vertical axis item, graph display, matrix display, highlight display, and the like). The information processing apparatus 100 reflects various inputs from the user in the internal processing.

The UI generation unit 504 generates various screens to be distributed to the terminal 140 of the user, the image forming apparatus 130, or the like. The UI generation unit 504 can generate various setting screens of the system 10, the screen of the aggregation result of the information regarding interruption for each interruption factor, and the like. In a certain aspect, the UI generation unit 504 may generate a screen using the hyper text markup language (HTML), cascading style sheets (CSS), Javascript (registered trademark), or the like. The UI generation unit 504 outputs the generated screen to the output unit 505.

The output unit 505 transmits the screen generated by the UI generation unit 504 to the terminal 140 of the user or the image forming apparatus 130. The user may refer to the distributed screen from the display of the terminal 140 or the display of the image forming apparatus 130.

The storage 506 is a storage area for logs, setting information of the system 10, and the like. In a certain aspect, the storage 506 may have a function as a database management system (DBMS). In another aspect, the storage 506 may be a storage area for storing data in another arbitrary format.

C. Screen Example

Next, with reference to FIGS. 6 to 11, variations of the screen of the aggregation result of the information regarding interruption for each interruption factor provided by the system 10 will be described.

Figure 6:
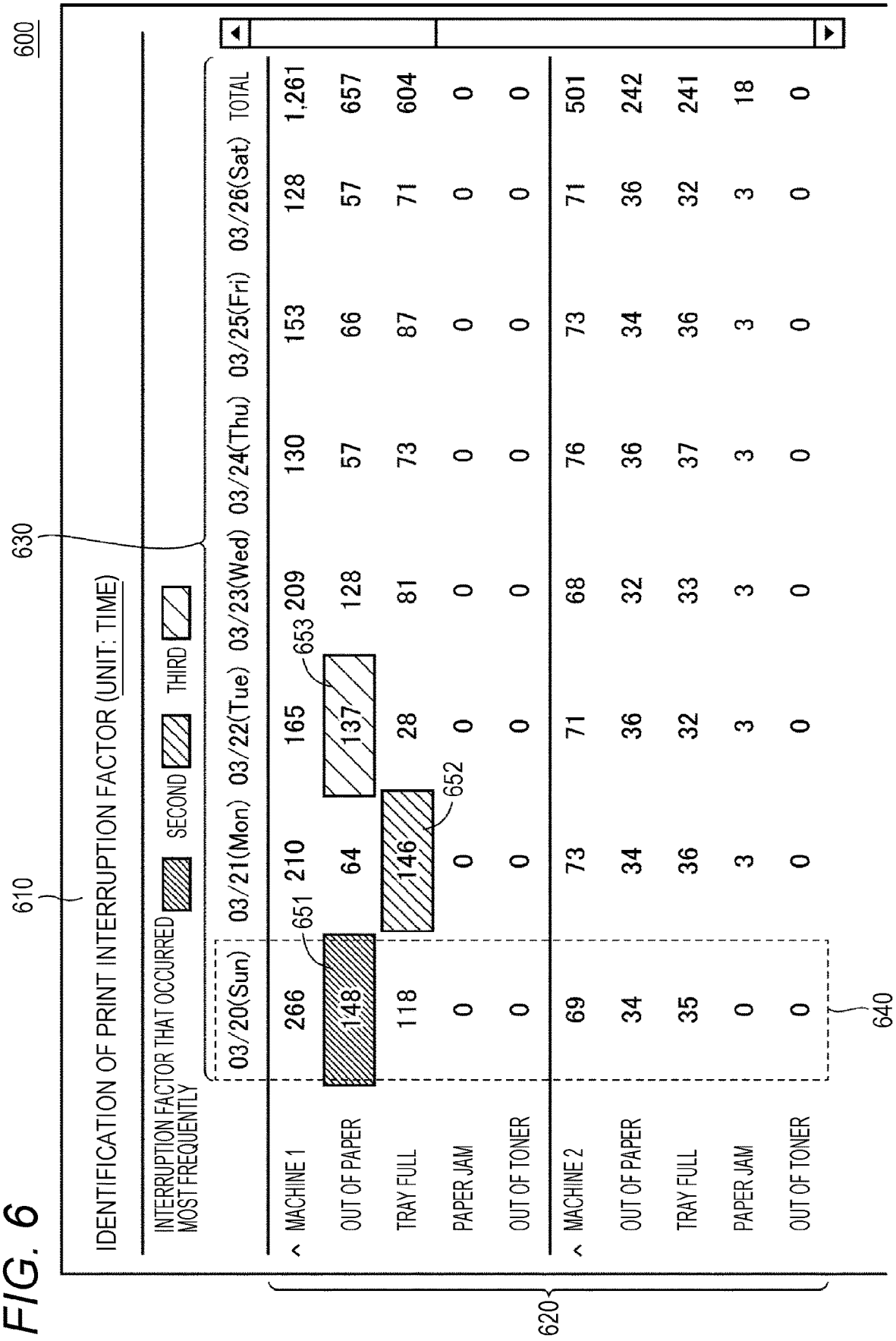
FIG. 6 is a diagram illustrating a second example of the screen of the aggregation result of the information regarding interruption for each interruption factor output by the system 10.

FIG. 6 is a diagram illustrating a second example of the screen of the aggregation result of the information regarding interruption for each interruption factor output by the system 10. The screen 600 displays the information regarding failures aggregated for each interruption factor for each image forming apparatus 130 in a matrix by dividing the information in units of one day. The information regarding the failure on the screen 600 is the number of interruptions, and the unit 610 is "times". A vertical axis 620 of the matrix is an interruption factor for each image forming apparatus 130, and a horizontal axis 630 of the matrix is a period (date).

That is, unlike the screen 300 that displays the aggregation result of the "interruption time" for each interruption factor for each image forming apparatus 130 by dividing the aggregation result in units of one day, the screen 600 displays the aggregation result of the "number of interruptions" for each interruption factor for each image forming apparatus 130 by dividing the aggregation result in units of one day.

The information regarding the failure shown on the screen 600 will be described using a first column 640 of the matrix as an example. The first column 640 indicates that printing interruption of a total of "266 times" has occurred in the machine 1 in the period of "3/20 (Sun)". Further, the first column 640 indicates that, among the total number of printing interruptions "266 times" in the machine 1, the number of interruptions caused by the interruption factor "out of paper" is "148 times", the number of interruptions caused by the interruption factor "tray full" is "118 times", the number of interruptions caused by the interruption factor "paper jam" is "0 times", and the number of interruptions caused by the interruption factor "out of toner" is "0 times".

Similarly, the first column 640 indicates that printing interruption of a total of "69 times" has occurred in the machine 2 in the period of "3/20 (Sun)". Further, the first column 640 indicates that, among the total number of printing interruptions "69 times" in the machine 2, the number of interruptions caused by the interruption factor "out of paper" is "34 times", the number of interruptions caused by the interruption factor "tray full" is "35 times", the number of interruptions caused by the interruption factor "paper jam" is "0 times", and the number of interruptions caused by the interruption factor "out of toner" is "0 times".

Further, the system 10 can highlight pieces of information regarding interruption satisfying a predetermined condition among the information regarding interruption displayed on the screen. In the example of the screen 600, the number of interruptions "148 times" (information 651 regarding interruption) caused by the interruption factor "out of paper" in the machine 1 of "3/20 (Sun)" is highlighted. Further, the number of interruptions "146 times" (information 652 regarding interruption) caused by the interruption factor "tray full" in the machine 1 of "3/21 (Mon)" is highlighted. Furthermore, the number of interruptions "137 times" (information 653 regarding interruption) caused by the interruption factor "out of paper" in the machine 1 of "3/22 (Tue)" is highlighted.

By referring to the screen 600, the user can grasp factors that frequently interrupt the printing process for each image forming apparatus 130.

FIG. 7 is a diagram illustrating a third example of the screen of the aggregation result of the information regarding interruption for each interruption factor output by the system 10. The screen 700 displays the information regarding failures aggregated for each interruption factor for each image forming apparatus 130 in a matrix by dividing the information in units of one week. The information regarding the failure on the screen 700 is the interruption time, and a unit 710 is "minute(s)". A vertical axis 720 of the matrix is the interruption factor for each image forming apparatus 130, and a horizontal axis 730 of the matrix is a period (week).

That is, unlike the screen 300 that displays the aggregation result of the interruption time for each interruption factor by dividing the aggregation result in "units of one day" for each image forming apparatus 130, the screen 700 displays the aggregation result of the interruption time for each interruption factor for each image forming apparatus 130 by dividing the aggregation result in "units of one week".

The information regarding the failure shown on the screen 700 will be described using a first column 740 of the matrix as an example. The first column 740 indicates that printing interruption of a total of "1504 minutes" has occurred in the machine 1 in the period of "2/27 to 3/5". Further, the first column 740 indicates that, out of the total time "1504 minutes" of the printing interruption in the machine 1, the interruption time caused by the interruption factor "out of paper" is "645 minutes", the interruption time caused by the interruption factor "tray full" is "529 minutes", the interruption time caused by the interruption factor "paper jam" is "330 minutes", and the interruption time caused by the interruption factor "out of toner" is "0 minute".

Similarly, the first column 740 indicates that printing interruption of a total of "570 minutes" has occurred in the machine 2 in the period of "2/27 to 3/5". Further, the first column 740 indicates that, out of the total time "570 minutes" of the printing interruption in the machine 2, the interruption time caused by the interruption factor "out of paper" is "243 minutes", the interruption time caused by the interruption factor "tray full" is "20 minutes", the interruption time caused by the interruption factor "paper jam" is "237 minutes", and the interruption time caused by the interruption factor "out of toner" is "70 minutes".

Further, the system 10 can highlight pieces of information regarding interruption satisfying a predetermined condition among the information regarding interruption displayed on the screen. In the example of the screen 700, an interruption time "688 minutes" (information 751 regarding interruption) caused by the interruption factor "out of paper" in the machine 1 of "3/27 to 4/2" is highlighted. Further, an interruption time "677 minutes" (information 752 regarding interruption) caused by the interruption factor "paper jam" in the machine 2 of "3/27 to 4/2" is highlighted. Furthermore, an interruption time "657 minutes" (information 753 regarding interruption) caused by the interruption factor "out of paper" in the machine 1 of "3/20 to 3/26" is highlighted.

By referring to the screen 700, the user can grasp the interruption factor of the printing process that frequently occurs for each image forming apparatus 130 in a long span such as 1 week. Further, for example, by comparing the screen 600 and the screen 700, in a case where the total of the one-week interruption time of a specific image forming apparatus 130 is large and there is a variation in the interruption time of individual dates of the specific image forming apparatus 130, the user can estimate the main cause of the printing interruption such as a proficiency level of the operator who operates the image forming apparatus 130 on a specific day of the week or the content of the job.

FIG. 8 is a diagram illustrating a fourth example of the screen of the aggregation result of the information regarding interruption for each interruption factor output by the system 10. The screen 800 displays the information regarding failures aggregated for each interruption factor for each operator in a matrix by dividing the information in units of one week. The information regarding the failure on the screen 800 is the interruption time, and a unit 810 is "minute(s)". A vertical axis 820 of the matrix is an interruption factor for each operator, and a horizontal axis 830 of the matrix is a period (week).

That is, unlike the screen 700 that displays the aggregation result of the interruption time for each interruption factor for each "image forming apparatus 130" by dividing the aggregation result in units of one week, the screen 800 displays the aggregation result of the interruption time for each interruption factor for each "operator" by dividing the aggregation result in units of one week.

The information regarding the failure shown on the screen 800 will be described using a first column 840 of the matrix as an example. The first column 840 indicates that printing interruption of a total of "1504 minutes" has occurred in the image forming apparatus 130 operated by the operator A in the period of "2/27 to 3/5". When the operator A operates the plurality of image forming apparatuses 130 during the period of "2/27 to 3/5", the total "1504 minutes" indicates the total time of interruption generated in the plurality of image forming apparatuses 130 operated by the operator A. Further, the first column 840 indicates that, out of the total time "1504 minutes" of the printing interruption in the image forming apparatus 130 operated by the operator A, the interruption time caused by the interruption factor "out of paper" is "645 minutes", the interruption time caused by the interruption factor "tray full" is "529 minutes", the interruption time caused by the interruption factor "paper jam" is "330 minutes", and the interruption time caused by the interruption factor "out of toner" is "0 minute".

Similarly, a first column 840 indicates that printing interruption of a total of "570 minutes" has occurred in the image forming apparatus 130 operated by the operator B in the period of "2/27 to 3/5". Further, the first column 840 indicates that, out of the total time "570 minutes" of the printing interruption in the image forming apparatus 130 operated by the operator B, the interruption time caused by the interruption factor "out of paper" is "243 minutes", the interruption time caused by the interruption factor "tray full" is "20 minutes", the interruption time caused by the interruption factor "paper jam" is "237 minutes", and the interruption time caused by the interruption factor "out of toner" is "70 minutes".

Further, the system 10 can highlight pieces of information regarding interruption satisfying a predetermined condition among the information regarding interruption displayed on the screen. In the example of the screen 800, an interruption time "688 minutes" (information 851 regarding interruption) caused by the interruption factor "out of paper" in the image forming apparatus 130 operated by the operator A of "3/27 to 4/2" is highlighted. Further, the interruption time "677 times" (information 852 regarding interruption) caused by the interruption factor "paper jam" in the image forming apparatus 130 operated by the operator B of "3/27 to 4/2" is highlighted. Furthermore, an interruption time "657 minutes" (information 853 regarding interruption) caused by the interruption factor "out of paper" in the image forming apparatus 130 operated by the operator A of "3/20 to 3/26" is highlighted.

By referring to the screen 800, the user can grasp factors that frequently interrupt the printing process for each operator. That is, the user can grasp the proficiency level of each operator, the tendency of what kind of interruption of printing process is easily caused, and the like.

FIG. 9 is a diagram illustrating a fifth example of the screen of the aggregation result of the information regarding interruption for each interruption factor output by the system 10. The screen 900 displays the information regarding failures aggregated for each interruption factor for each image forming apparatus 130 in a matrix in association with the operator using the image forming apparatus 130 by dividing the information in units of one week. The information regarding the failure on the screen 900 is the interruption time, and a unit 910 is "minute(s)". A vertical axis 920 of the matrix is the interruption factor for each image forming apparatus 130, and a horizontal axis 930 of the matrix is a period (week) and an operator.

The information regarding the failure shown on the screen 900 will be described using a first column 940 of the matrix as an example. The first column 940 indicates that when the user of the machine 1 in the period "2/27 to 3/5" is "operator A", printing interruption of a total of "1504 minutes" occurs in the machine 1. In addition, the first column 940 indicates that, out of the total time "1504 minutes" of the printing interruption in the machine 1, the interruption time caused by the interruption factor "out of paper" is "645 minutes", the interruption time caused by the interruption factor "tray full" is "529 minutes", the interruption time caused by the interruption factor "paper jam" is "330 minutes", and the interruption time caused by the interruption factor "out of toner" is "0 minute".

Similarly, the first column 940 indicates that when the user of the machine 2 in the period "2/27 to 3/5" is "operator B", printing interruption of a total of "1050 minutes" occurs in the machine 2. In addition, the first column 940 indicates that, out of the total time "1050 minutes" of the printing interruption in the machine 2, the interruption time caused by the interruption factor "out of paper" is "343 minutes", the interruption time caused by the interruption factor "tray full" is "200 minutes", the interruption time caused by the interruption factor "paper jam" is "437 minutes", and the interruption time caused by the interruption factor "out of toner" is "70 minutes".

Further, the system 10 can highlight pieces of information regarding interruption satisfying a predetermined condition among the information regarding interruption displayed on the screen. In the example of the screen 900, regarding the machine 1, the period "3/27 to 4/2" and the interruption time "688 minutes" (information 951A regarding interruption) caused by the interruption factor "paper jam" in the machine 1 with the user "operator B" are highlighted. Further, the period "3/20 to 3/26" and an interruption time "657 times" (information 952A regarding interruption) caused by the interruption factor "out of paper" in the machine 1 with the user "operator A" are highlighted. Furthermore, the period "2/27 to 3/5" and the interruption time "645 minutes" (information 953A regarding interruption) caused by the interruption factor "out of paper" in the machine 1 with the user "operator A" are highlighted.

Similarly, in the example of the screen 900, regarding the machine 2, the period "3/27 to 4/2" and the interruption time "677 minutes" (information 951B regarding interruption) caused by the interruption factor "paper jam" in the machine 2 with the user "operator B" are highlighted. Further, the period "3/27 to 4/2" and an interruption time "660 times" (information 952B regarding interruption) caused by the interruption factor "tray full" in the machine 2 with the user "operator B" are highlighted. Furthermore, the period "3/6 to 3/12" and an interruption time "640 minutes" (information 953B regarding interruption) caused by the interruption factor "paper jam" in the machine 2 with the user "operator B" are highlighted.

By referring to the screen 900, the user can grasp the compatibility and the like of each image forming apparatus 130 and each operator. Thus, the user can take measures such as causing each operator to intensively use the compatible image forming apparatus 130 or causing each operator to practice an operation of the image forming apparatus 130 which he or she is not good at.

FIG. 10 is a diagram illustrating a sixth example of the screen of the aggregation result of the information regarding interruption for each interruption factor output by the system 10. The screen 1000 displays the information regarding failures aggregated for each interruption factor in a matrix by dividing the information in units of image forming apparatuses. The information regarding the failure on the screen 1000 is the interruption time, and a unit 1010 is "minute(s)".

The screen 1000 displays the aggregation result of the interruption time for each interruption factor detected within an arbitrary period (1 month, 1 year, or the like) determined by setting by the user or the like, divided by "unit of image forming apparatus 130". The vertical axis 1020 of the matrix is an interruption factor, and the horizontal axis 1030 of the matrix is the image forming apparatus 130.

The information regarding the failure shown on the screen 1000 will be described using a first column 1040 of the matrix as an example. The first column 1040 shows an aggregate of the interruption time for each interruption factor occurred in the "machine 1" within a certain period. More specifically, the first column 1040 indicates that, in the "machine 1", the interruption time caused by the interruption factor "out of paper" occurs "611 minutes", the interruption time caused by the interruption factor "tray full" occurs "404 minutes", the interruption time caused by the interruption factor "paper jam" does not occur ("0 minute"), and the interruption time caused by the interruption factor "out of toner" does not occur ("0 minute").

Further, the system 10 can highlight pieces of information regarding interruption satisfying a predetermined condition among the information regarding interruption displayed on the screen. In the example of the screen 1000, an interruption time "611 minutes" (information 1051 regarding interruption) caused by the interruption factor "out of paper" in the "machine 1" is highlighted. Further, an interruption time "404 minutes" (information 1052 regarding interruption) caused by the interruption factor "tray full" in the "machine 1" is highlighted. Furthermore, an interruption time "400 minutes" (information 1053 regarding interruption) caused by the interruption factor "tray full" in the "machine 5" is highlighted.

By referring to the screen 1000, the user can grasp, for example, the occurrence status of printing interruption of each image forming apparatus 130 over a long period. Then, the user can identify the image forming apparatus 130 having a problem (having frequent printing interruption).

Figure 11:
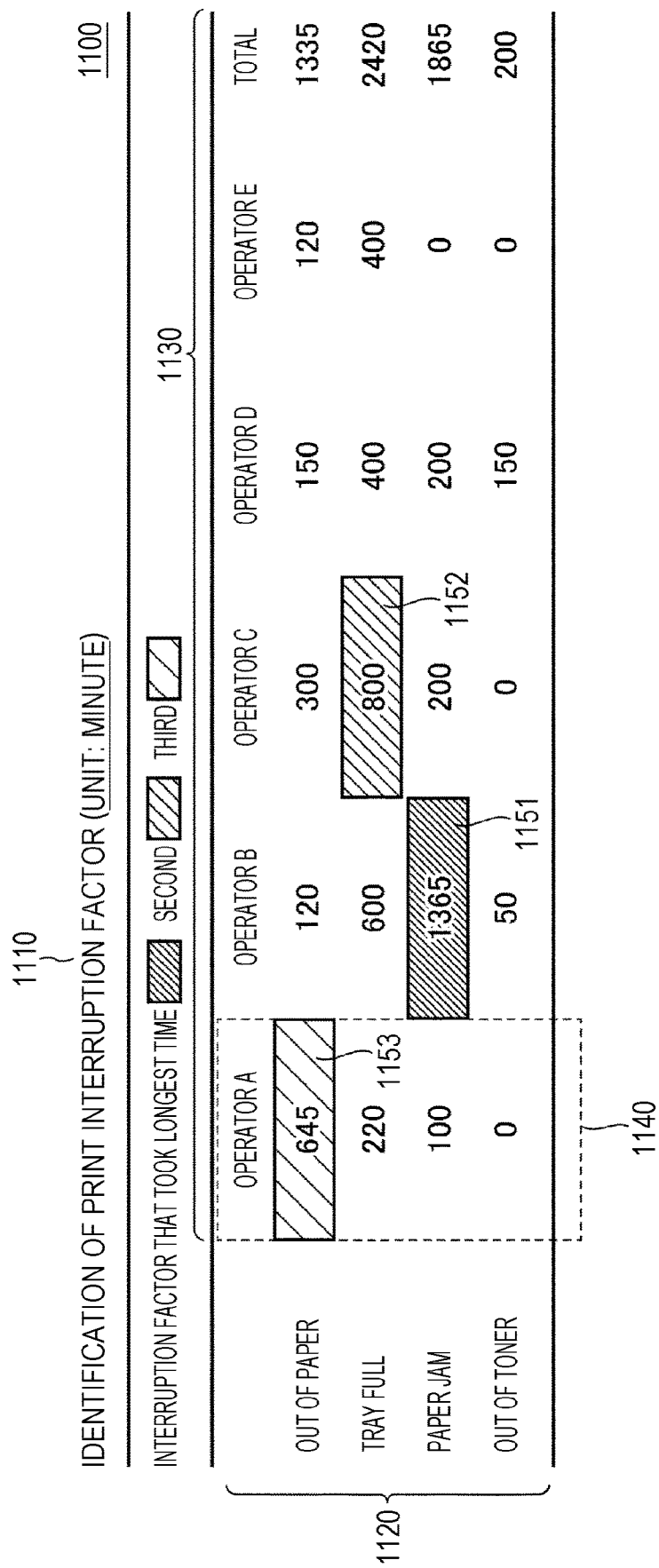
FIG. 11 is a diagram illustrating a seventh example of the screen of the aggregation result of the information regarding interruption for each interruption factor output by the system 10.

FIG. 11 is a diagram illustrating a seventh example of the screen of the aggregation result of the information regarding interruption for each interruption factor output by the system 10. The screen 1100 displays the information regarding failures aggregated for each interruption factor in a matrix by dividing the information in units of operators. For example, the column of "operator A" indicates the total interruption time for each interruption factor, which has occurred in all the image forming apparatuses 130 used by the operator A in a certain period. The information regarding the failure on the screen 1100 is the interruption time, and the unit 1010 is "minute(s)".

The screen 1100 displays the aggregation result of the interruption time for each interruption factor detected within an arbitrary period (1 month, 1 year, or the like) determined by setting or the like by the user, divided in "units of operators". The vertical axis 1120 of the matrix is an interruption factor, and the horizontal axis 1130 of the matrix is an operator.

The information regarding the failure shown on the screen 1100 will be described using a first column 1140 of the matrix as an example. A first column 1140 indicates an aggregate of the interruption time for each interruption factor occurred when "operator A" operates the image forming apparatus 130 within a certain period. More specifically, the first column 1140 indicates that, when the operator A operates the image forming apparatus 130, an interruption time caused by the interruption factor "out of paper" occurs "645 minutes", an interruption time caused by the interruption factor "tray full" occurs "220 minutes", an interruption time caused by the interruption factor "paper jam" occurs "100 minutes", and an interruption time caused by the interruption factor "out of toner" does not occur ("0 minutes").

Further, the system 10 can highlight pieces of information regarding interruption satisfying a predetermined condition among the information regarding interruption displayed on the screen. In the example of the screen 1100, an interruption time "1365 minutes" (information 1151 regarding interruption) caused by the interruption factor "paper jam" generated when the operator B operates the image forming apparatus 130 is highlighted. Further, an interruption time "800 minutes" (information 1152 regarding interruption) caused by the interruption factor "tray full" generated when the operator C operates the image forming apparatus 130 is highlighted. Furthermore, an interruption time "645 minutes" (information 1153 regarding interruption) caused by the interruption factor "out of paper" generated when the operator A operates the image forming apparatus 130 is highlighted.

By referring to the screen 1100, the user can grasp, for example, the tendency of each operator over a long period (what kind of interruption of printing process is easily caused). Then, the user can take measures such as reviewing the operation content of each operator.

D. Flowchart

Figure 12:
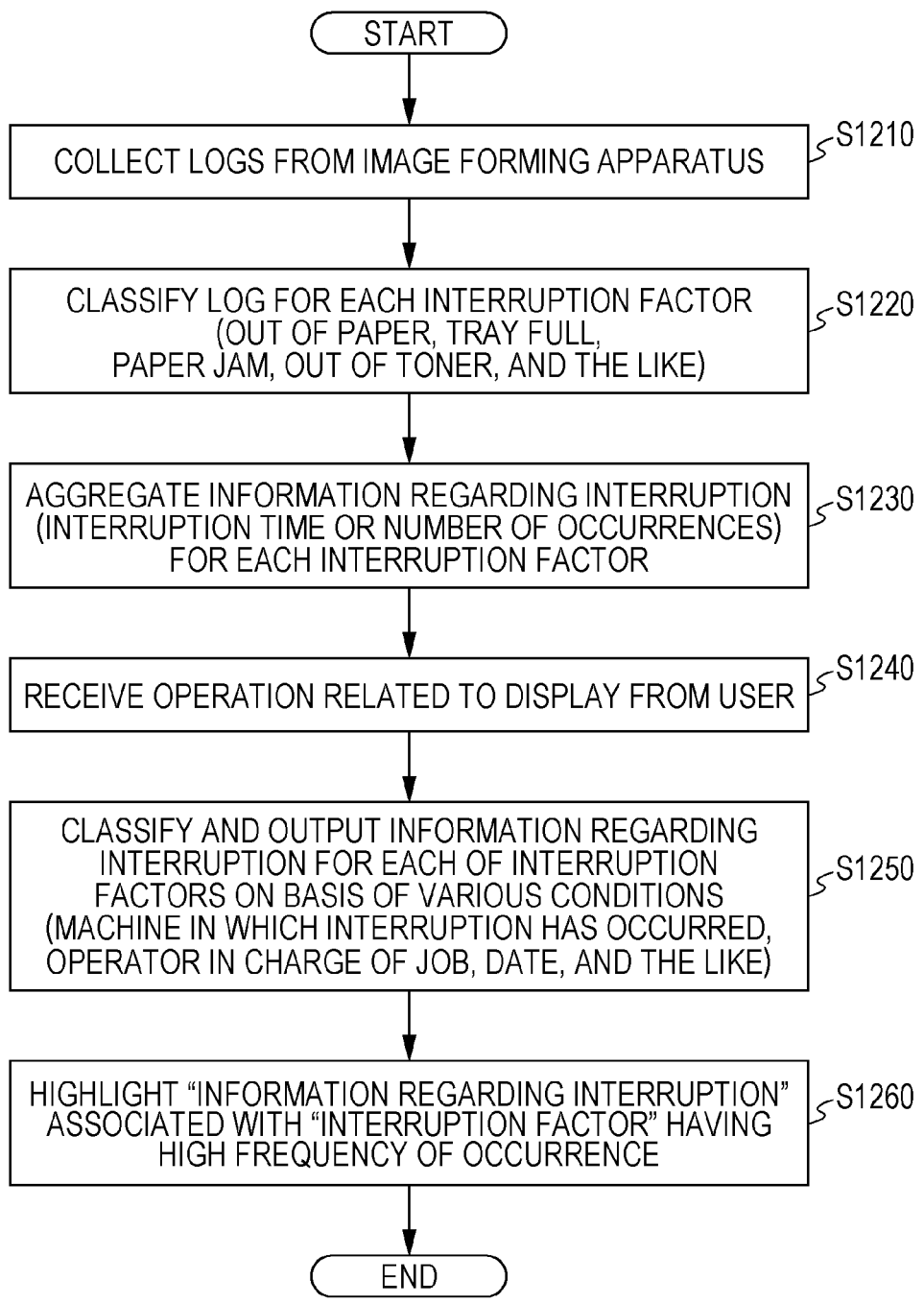
FIG. 12 is a flowchart illustrating an example of a procedure of internal processing of the information processing apparatus 100.

FIG. 12 is a flowchart illustrating an example of a procedure of internal processing of the information processing apparatus 100. Internal processing of the information processing apparatus 100 will be described with reference to FIG. 12. In a certain aspect, the CPU 1 may read a program or instructions for performing the processing of FIG. 12 from the secondary storage device 3 into the primary storage device 2 and execute the program or instructions. In a certain aspect, a part or all of the processing may also be implemented as a combination of circuit elements formed to execute the processing.

In step S1210, the information processing apparatus 100 collects logs from one or more image forming apparatuses 130. In a certain aspect, the information processing apparatus 100 may collect logs from the image forming apparatus 130 via the log collection apparatus 120. In another aspect, the information processing apparatus 100 may directly collect logs from the image forming apparatus 130.

In step S1220, the information processing apparatus 100 classifies and aggregates the collected log for each interruption factor (out of paper, tray full, paper jam, out of toner (ink), or the like). In a certain aspect, the information processing apparatus 100 may classify and aggregate logs on the basis of information indicating an interruption factor (an identifier of the interruption factor or the like) included in the logs.

In step S1230, the information processing apparatus 100 aggregates the information regarding interruption (interruption time, number of occurrences, or the like) for each of the interruption factors.

In step S1240, the information processing apparatus 100 receives an operation related to display from the user. The display herein refers to a screen (screen 300, screen 600 to screen 1100, or the like) of the aggregation result of the information regarding interruption, and the user can set display items (vertical axis and horizontal axis of a matrix or a graph), a layout (a matrix, a graph, or the like), and the like of the screen of the aggregation result of the information regarding interruption. In another aspect, the information processing apparatus 100 may distribute a setting screen related to display to the terminal 140 of the user. In this case, the user can input settings of display items, layout, and the like of the screen of the aggregation result of the information regarding interruption to the distributed setting screen. The setting of the layout may include, for example, a setting in which information regarding interruption is classified, aggregated, and displayed by any two or more items of one or more image forming apparatuses 130, an operator of one or more image forming apparatuses 130, and a period set by a user. The information processing apparatus 100 can generate the layout of the screen on the basis of the setting input. Note that the processing of this step may be executed at any timing such as before step S1210.

In step S1250, the information processing apparatus 100 classifies and aggregates the information regarding interruption for each of the interruption factors on the basis of various conditions (the machine in which the interruption has occurred, the operator in charge of the job, the date, and the like), and outputs the information. The various conditions can be used as the first item (vertical axis) and the second item (horizontal axis) of the matrix. In a certain aspect, the various conditions may include only the first item or may include three or more items (image forming apparatus, operator, period, or the like) as in the screen 900. The information processing apparatus 100 can generate a screen on the basis of a condition. As an example, the information processing apparatus 100 outputs the screen 300, the screens 600 to 1100, and the like. The information processing apparatus 100 may distribute the generated screen to the terminal 140 of the user. In this case, the screen 300, the screens 600 to 1100, and the like are displayed on the display of the terminal 140. In a certain aspect, in step S1240, the information processing apparatus 100 may receive inputs of various conditions used in this step. As an example, the information processing apparatus 100 analyzes a log collected from each of one or more image forming apparatuses 130, and aggregates information regarding interruption for each of the interruption factors included in the log. Then, the information processing apparatus 100 generates a layout of the screen (screen 1000, screen 1100, and the like) in which the aggregated information regarding interruption is classified and aggregated for each of the one or more image forming apparatuses or for each of operators who operate the one or more image forming apparatuses.

In step S1260, the information processing apparatus 100 highlights "information regarding interruption" associated with the "interruption factor" having a high frequency of occurrence. The highlighting corresponds to, for example, highlighting on the screen 300, the screen 600 to the screen 1100. In a certain aspect, the information processing apparatus 100 may highlight the "information regarding interruption" by any means including setting bold letters, setting colored letters, changing the font, changing the character size, changing the background color, setting ruled lines, or a combination thereof on the "information regarding interruption".

As described above, the system 10 according to one or more embodiments collects logs from one or more image forming apparatuses 130, classifies and aggregates the logs, and calculates the aggregation result of the information regarding interruption for each interruption factor. Furthermore, the system 10 may output a screen or a segmented screen that classifies the aggregation result of the information regarding interruption according to any condition (unit of image forming apparatus 130, unit of operator, unit of fixed period) or any combination of conditions.

The user can grasp what has mainly caused the interruption of the printing process of the image forming apparatus by referring to the aggregation result of the information regarding interruption provided by the system 10. Further, the user can make a lasting response to a failure by considering improvement measures against frequent interruption factors on the basis of the grasped cause, and it is possible to reduce the downtime (interruption time) and improve the productivity of printing operation.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims. Further, the disclosure contents described in the above embodiments and the respective modification examples are intended to be implemented either alone or in combination as much as possible.

What is claimed is:

1. A method for outputting information in a printing process, the method comprising:
   acquiring, from an image forming apparatus, a log including a piece of interruption information for each of a plurality of interruption factors;
   aggregating, for each of the interruption factors, a plurality of pieces of the interruption information; and
   outputting the interruption information aggregated for each of the interruption factors, wherein the log includes at least one of:
      identification information of the image forming apparatus, and
      identification information of an operator who operates the image forming apparatus, and
   the outputting the interruption information includes at least one of:
      outputting the interruption information for each of the interruption factors in the image forming apparatus, and
      outputting the interruption information for each of the interruption factors for each operator.

2. The method according to claim 1, wherein the interruption information includes an interruption time in the printing process.

3. The method according to claim 2, wherein the interruption time starts from when the printing process is interrupted due to any one of the interruption factors and ends when the printing process is resumed.

4. The method according to claim 3, wherein
the outputting the interruption information includes:
outputting a cumulative total of the interruption time in a fixed period for each of the interruption factors.

5. The method according to claim 3, wherein
the outputting the interruption information includes:
outputting an average value of the interruption time in a fixed period for each of the interruption factors.

6. The method according to claim 1, wherein the interruption information includes a number of interruptions of the printing process.

7. The method according to claim 6, wherein
the outputting the interruption information includes:
outputting a cumulative total of the number of interruptions in a fixed period for each of the interruption factors.

8. The method according to claim 6, wherein
the outputting the interruption information includes:
outputting an average value of the number of interruptions in a fixed period for each of the interruption factors.

9. The method according to claim 1, wherein
the outputting the interruption information includes:
outputting the interruption information aggregated by dividing the interruption information in a fixed period for each of the interruption factors.

10. The method according to claim 1, wherein
the outputting the interruption information includes:
displaying the interruption information in a matrix based on a first item and a second item.

11. A method for outputting information in a printing process, the method comprising:
acquiring, from an image forming apparatus, a log including a piece of interruption information for each of a plurality of interruption factors;
aggregating, for each of the interruption factors, a plurality of pieces of the interruption information; and
outputting the interruption information aggregated for each of the interruption factors, wherein the outputting the interruption information includes:
highlighting one or more pieces of the interruption information that satisfy a predetermined condition among a plurality of pieces of the interruption information included in an output screen, and
the highlighting the one or more pieces of the interruption information that satisfy the predetermined condition includes:
highlighting the interruption information having a value in ranks equal to or higher than a rank order designated as a criterion for extracting an interruption factor that frequently causes interruption among the interruption information displayed on the output screen.

12. The method according to claim 11, wherein
the highlighting the interruption information having the value in the ranks equal to or higher than the rank order includes:
changing the highlighting in stages depending on the value in the ranks or the rank order of the interruption information.

13. A non-transitory computer readable recording medium storing instructions for causing a computer to execute the method according to claim 1.

14. An apparatus comprising:
a storage that stores the instructions according to claim 13; and
one or more processors for executing the instructions.

15. A non-transitory computer readable recording medium storing instructions for causing a computer to execute the method according to claim 11.

16. An apparatus comprising:
a storage that stores the instructions according to claim 15; and
one or more processors for executing the instructions.

* * * * *